April 1, 1958 V. J. SCOTT 2,829,197
NOISE LIMITER FOR TELEVISION RECEIVER
Filed Feb. 16, 1951
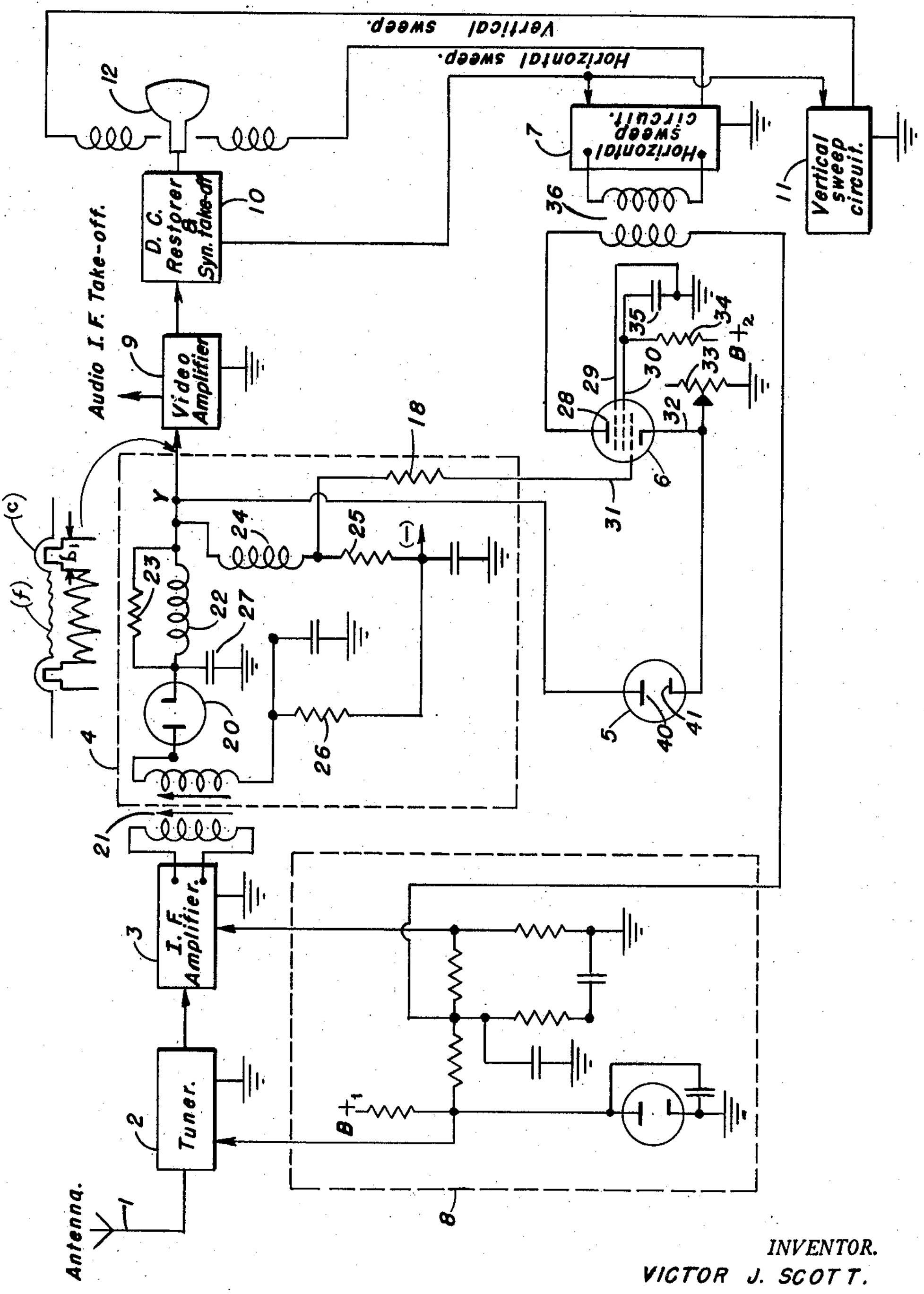
INVENTOR.
VICTOR J. SCOTT.
BY
Alden D. Redfield
ATTORNEY.

United States Patent Office 2,829,197

Patented Apr. 1, 1958

2,829,197

NOISE LIMITER FOR TELEVISION RECEIVER

Victor J. Scott, Cincinnati, Ohio, assignor to Avco Manufacturing Corporation, Cincinnati, Ohio, a corporation of Delaware Application February 16, 1951, Serial No. 211,329

6 Claims. (Cl. 178—7.3)

This invention relates to television receiver circuits and more specifically to circuits for limiting noise peaks in the video channel and AGC circuit.

In the past, many television receiver circuits omitted an AGC circuit because of difficulties experienced with excessive AGC bias generated by noise voltages. The development of a keyed AGC circuit was a move in the correct direction. However, even keyed AGC circuits allow the noise voltage, which coincides in time phase with the keying voltage, to influence the output bias voltage. With this in mind, it becomes a basic object of my invention to eliminate at least a portion of this error voltage.

It is well known that noise voltages have always been a problem in the video channel, especially noise peaks occurring in the blacker than black region, because of their ability to throw the deflection circuits out of sync. This being recognized, long prior to general adoption by the industry of the inter-carrier sound principle, various noise limiting circuits were developed which used a direct coupling between the second detector and the video amplifier along with some form of noise limiting action. In some of these circuits, the composite television signal was fed from the second detector with such polarity that noise pulses in the blacker than black region would drive the video amplifier below cut-off, by reason of a threshold bias which was established on the video amplifier input circuit, thereby effectively eliminating blacker than black noise peaks as far as the remainder of the video channel, including the sync separator circuit, was concerned. Other circuits were based upon the idea of using an inverted replica of the sync pulse to buck-out the sync component and superimposed noise voltage from the composite signal. Then the signal was fed to the video amplifier with such polarity that the input circuit could be threshold biased to clip off all noise peaks blacker than the black level, thereby cutting down the noise to signal ratio of the signal fed to the kinescope. Though circuits of this nature have had a measure of success when used in a conventional television circuit, they can not be used in an inter-carrier sound type system because there the video amplifier also amplifies the sound I. F. carrier and if the video amplifier is driven to cut-off by any signal having a P. R. F. within the audible range, the resultant amplitude modulation of the I. F. carrier shows up as a buzz in the audio transducer output. With these factors well in mind, it becomes a basic object of this invention to produce a noise limiting circuit for either an inter-carrier sound type or conventional television receiver, which is not only capable of limiting noise peaks, during reception of picture signal components, to a level somewhat closer to the white level than the sync pulse peaks, but which is also capable of automatically changing its limiting level, during sync pulse periods, to a level somewhat farther away from white than the sync pulse peaks.

It is also a general object of this invention to produce a noise limiting circuit which uses a minimum number of extra circuit elements and which is capable of not only limiting blacker than black, noise peaks, during the picture component period, to a point closer to the white level than the sync pulse peak without clipping the sync pulses during the sync pulse period, but which is also capable of limiting the influence of noise peaks on a keyed AGC control bias.

It is a further and still more general object of this invention to produce a noise limiter for limiting noise voltage peaks which would otherwise interfere with the functions of the sync separation and AGC circuits in a television receiver.

In accordance with a particular form of the invention, which is illustrated, I have shown my novel noise limiting circuit in connection with an inter-carrier sound type of television receiver. It is to be noted that the noise limiter will also function in a conventional television receiver; however, it will become clear that its peculiar advantages can be more completely exploited in a receiver of the inter-carrier sound type. As will hereinafter be more exhaustively explained, I take the output from the second detector and apply it to the anode of a noise limiting diode whose cathode is connected to a convenient threshold bias source comprising the cathode of an AGC amplifier. As will become more apparent after reading the complete disclosure, the selection of diode coupling polarity, in the illustrated embodiment, was controlled by the polarity of the second detector output. A complete understanding of the operation of this circuit should enable one skilled in the art to vary this coupling polarity in accordance with the dictates of existing polarities, in the circuit into which it is desired to apply my novel combination. To continue this brief explanation of circuit operation, the AGC amplifier, being plate keyed by pulses taken from the horizontal sweep circuit, supplies a limiting threshold bias voltage to control the noise limiting diode, which varies first, during picture component periods, in accordance with the amplitude of lower frequency portions of the picture signal component and second, during the sync pulse periods, in accordance with the peak voltage of the individual sync pulses. It then becomes apparent that the limiting diode is supplied with a dynamic threshold bias which allows the limiting level to be set closer to the white level than the sync pulse peaks, during picture component periods and farther away from the white level during sync pulse periods, thereby clipping off the great majority of high frequency noise peaks which would otherwise interfere with the function of the sync separator circuit. The limiting of noise peaks in the AGC circuit arises from the fact that the diode impresses the clipped noise peaks on the cathode of the AGC amplifier. This positive noise voltage on the AGC amplifier cathode tends to counteract the effect of positive lower frequency noise fed to the AGC amplifier control grid.

For a better understanding of the present invention, together with other and further objects, advantages and capabilities thereof, reference is made to the following disclosure and appended claims in connection with the accompanying drawing, in the single figure of which I have shown a particular form of my novel noise limiter circuit connected into an inter-carrier sound type television receiver which also includes a keyed AGC system.

Referring now to the drawing I have illustrated a circuit diagram, partly schematic, of a complete inter-carrier sound type television receiver, except for the audio channel, which is of no importance here. In general, the receiver includes an antenna 1 coupled to a tuner circuit 2. The tuner circuit 2 comprises any conventional stage of R. F. amplification and oscillator modulation, either of the channel-selector-switch type or the preferred continuous tuner type. The output of tuner 2 is fed to a conventional I. F. amplifier 3 which, as is well known, acts to amplify both the video I. F. signal and the first audio I. F. signal. The output of I. F. amplifier 3 is conventionally coupled to second detector 4 which functions to produce a composite video signal, sans carrier, and a frequency modulated second I. F. audio carrier having a center frequency of 4.5 mc. The output of the second detector 4 has such a polarity as to allow my novel diode noise limiter 5 to suppress blacker than black noise peaks above a given level. The output of the second detector 4 is also fed to AGC amplifier 6 which is plate keyed by a pulse taken from the horizontal sweep circuit 7. The output of the AGC amplifier 6 is then fed to an AGC network 8 where it is integrated and fed back to control the bias for the R. F. section in tuner 2 and at least a part of the tubes in I. F. amplifier 3. The noise limited composite video signal fed into the video amplifier 9 along with the second I. F. carrier is amplified therein with the audio I. F. being tapped off in any conventional manner such as with a 4.5 mc. trap. The composite video signal stripped of the audio I. F. carrier is fed through a D. C. restorer and sync pulse take-off circuit 10. The sync pulses taken from element 10 are fed into the horizontal sweep circuit 7 and vertical sweep circuit 11 to maintain these units in synchronization with the appropriate sync pulses contained in the composite television signal. The output of the horizontal sweep 7 and vertical sweep circuit 11 drives a conventional deflection yoke associated with kinescope 12, thereby deflecting the electron beam modulated by the output from the video amplifier 9.

Referring now more particularly to the portion of the receiver embodying the present invention, a conventional video detector is shown as element 4. This detector comprises a diode 20 having its anode directly coupled to the secondary of coupling transformer 21 and having its cathode coupled through peaking inductance 22 and shunted damping resistor 23, to the input of video amplifier 9. When diode 20 is conducting, current flows through previously mentioned peaking inductor 22 and damping resistance 23, a second peaking inductor 24, resistors 25 and 26 and the secondary of coupling transformer 21, to produce a varying D. C. voltage corresponding to the amplitude variations of the I. F. signal. These variations, which contain both the picture information and the audio information, are separated from the respective I. F. frequencies, video and audio, as well as from various undesired harmonics generated during the demodulation process within the detector, by capacitor 27 which is connected between the diode cathode and ground together with the normal stray capacitances. The parameter of capacitor 27 is selected so as to offer a low reactance to the I. F. and harmonic signals, shunting them around the detector load impedance. However, this capacitor offers a much higher reactance to the video signal and the audio-second-I. F.-carrier frequency, thereby allowing these signals to be impressed across the detector output impedance. Peaking inductor 22 also offers a high impedance to the undesired I. F. signals, thereby preventing them from reaching the video amplifier via the detector output circuit. Resistor 23 is a conventional loading resistor which damps any transient overshoot and oscillatory ringing in the frequency response of the detector output due to resonance between inductor 22 and stray capacitances. A negative bias source is connected to the lower end of resistor 25 for supplying a fixed bias potential to both the input circuit of video amplifier 9 and the input circuit of AGC amplifier 6.

In accordance with the particular form of the invention, which is illustrated, the keyed AGC amplifier 6 comprises a pentode having an anode 28, a suppressor grid 29 which is connected to ground, a screen grid 30, a control grid 31 and a cathode 32. The cathode 32 is connected to ground through a variable resistance 33 which may be supplied in the form of a conventional potentiometer. Screen grid voltage is supplied from a source of potential ($B+_1$) connected to the screen grid through resistor 34. Capacitor 35 which is connected between the screen grid and ground, in conjunction with resistor 34, supplies a constant screen grid potential. Plate potential for AGC amplifier 6 is supplied across the secondary of coupling transformer 36, which is connected in series with the anode-cathode circuit of AGC amplifier 6 and AGC network 8. This potential, which can be called a keying potential, is supplied in the form of pulses which coincide in time phase with the horizontal sync pulses. The control grid 31 of AGC amplifier 6 is supplied with a signal from the tap between inductor 24 and resistor 25 in the output of second detector 4. Noise limiting diode 5 has an anode 40 connected to the input circuit of the video amplifier 9 and a cathode 41 connected to the cathode 32 of AGC amplifier 6.

Considering now the operation of the AGC and noise limiter circuits just outlined, an operational cycle of the AGC amplifier will first be described. Assume that the blanking pulse period ($b_1$), as shown in the curve of video amplifier input signal, has just been completed and a picture component period commenced. At this point the plate of the AGC amplifier 6 has a negative potential with respect to ground, being held at this potential by the charge stored on the capacitors in AGC network 8. These capacitors can be considered to have been previously charged by conduction through AGC amplifier 6 during the sync pulse period, which was part of the abovementioned blanking pulse interval ($b_1$). Conduction at that time resulted from the simultaneous impression of a positive sync pulse on grid 31 and a positive plate keying pulse, from the secondary of coupling transformer 36, in series with AGC network 8 and the plate-cathode path of AGC amplifier 6. Considering the picture component period, when the plate keying pulse is not active, it is apparent that the potential of plate 28 is completely controlled by the potential across the AGC network 8, with the result that plate 28 is negative with respect to ground during this period.

As can be seen from the video amplifier input signal curve, the picture components are fed to grid 31 of amplifier 6 with the black level having a potential which is positive relative to the white level potential. This signal is also fed to anode 40 of noise limiting diode 5. At first glance it would seem that the same signal is being impressed on both the grid and cathode of amplifier 6. However, as will become apparent this is not true because the cathode following action of amplifier 6 places a positive bias on the cathode 41 of diode 5 with the result that current flow in the diode is blocked to all signals having a potential below that of cathode 32. In other words, the potential at cathode 32 supplies a threshold bias component for the noise limiting diode and current can not be conducted through the diode until the potential on diode plate 40 overcomes this bias.

The manner in which the noise limiting threshold bias is produced is fundamental to an understanding of complete circuit operation, and the circuit which controls generation of this voltage will now be exclusively considered. Assume that an undesirable noise pulse is superimposed upon the picture component signal and assume that the noise pulse has an amplitude many times that of the picture component, both voltages appearing across the detector load which comprises the combined impedances of inductor 24 and resistor 25. Because of the relative high impedance which inductor 24 presents to high frequency signals, substantially the whole drop across this inductor is caused by high frequency components and in the main only the low frequency noise components and picture components will be impressed across resistor 25. Since the input circuit of AGC amplifier 6 is tapped across resistor 25, the high frequency signals which are dropped across inductor 24 are not present on grid 31. Also it is to be noted that grid resistor 18 along with the capacitance to ground of grid 31 attenuates any high frequency component which might be impressed across resistance 25 before this signal can influence the input of the AGC amplifier. This last mentioned attenuating action arises due to the fact that the capacitance to ground of grid 31 forms a low impedance path to ground at higher frequencies.

In other words, high frequency picture components and high frequency noise components do not reach grid 31. It follows then that grid 31 does not modulate the screen grid-cathode current with these high frequency signals and the voltage across cathode 32, which is proportional to the screen grid current flow during the picture component period, does not include a voltage proportional to these high frequency components. Since cathode 41 of diode 5 is directly connected to cathode 32 of the AGC amplifier, the cathode of the diode is threshold biased by only the low frequency components of the picture signal and superimposed noise voltages.

It should be remembered at this point that, even though the amplification across the cathode of a cathode follower is less than unity, the instantaneous potential of the cathode is always at a potential which is above the grid potential. This factor is very important to the operation of the circuit. In other words, the D. C. level of the cathode is always higher than the D. C. level of the grid, however, the peak to peak amplitude swing of the A. C. component on the grid of the cathode follower is always greater than the peak to peak value of the A. C. component on the cathode. Applying this to the explanation at hand, it can be seen that the instantaneous potential on cathode 32 is always higher than the instantaneous potential on the grid 31. It follows then that the potential at cathode 41 of diode 5 is always higher than the potential of grid 31 but, as is explained above, the high frequency picture components and the high frequency noise components are not present on grid 31 and therefore there is no amplified version of these components on either cathode 32 of AGC amplifier 6 or cathode 41 of noise limiting diode 5. It is this factor, along with the fixed bias, which is placed on diode 5, that allows diode 5 to function as a noise limiter.

Referring to the circuit of Fig. 1, it will be noticed that the fixed negative bias supplied to the input of video amplifier 9 and the input of the AGC amplifier is connected to one side of resistor 25. Since the anode of diode limiter 5 is also connected to the input of the video amplifier 9 this bias acts as a fixed limiting threshold voltage in series with the drop across resistor 33, as far as diode 5 is concerned. This means that the amplitude of the signal impressed across the output of the detector, i. e., inductor 24 and resistor 25, must be larger than the sum of the two voltages comprising the fixed bias potential and the drop across cathode resistor 33 before diode 5 conducts.

Whenever a noise pulse is impressed across the output of detector 4, anode 40 of diode 5 instantaneously attempts to follow its positive excursion, while cathode 41 of the diode is at the same voltage as the cathode of tube 6. The total bias on diode 5 has an amplitude which is proportional to the sum of the amplitudes of the abovementioned fixed bias and the low frequency components present in the picture signal and noise voltage peaks. The resultant bias is shown in an idealized form at (*f*) on the input signal curve. Thus there is a difference of potential across the electrodes of diode 5 and diode 5 conducts, whereby there is an increased current flow through diode 5 and an increased drop across diode detector 20 and peaking network 22, 23. Diode 5 then clamps terminal Y, at the input of the video amplifier, to the threshold bias established at the cathode of diode 5. Thus the higher frequency noise voltages are not amplified in the video amplifier 9. The action of the diode limiter during a sync pulse is somewhat similar except for a keying action supplied by plate conduction through the AGC amplifier. As will be seen, during the sync pulse period, in order not to clip off a portion of the sync pulse, the threshold bias is automatically raised by the plate keying action and resulting plate current flow through AGC amplifier 6.

When a plate keying pulse is impressed across the secondary of coupling transformer 36, in time phase coincidence with a sync pulse on grid 31, conduction is initiated in the plate-cathode circuit of amplifier 6. At the same time there is a decrease in screen grid current flow due to the destruction of the virtual cathode, which had formed above the screen grid during the picture component period when a negative potential was impressed on plate 28 relative to cathode 32. Destruction of the virtual cathode decreases the electron flow to screen grid 30 at the same instant of time that the electron flow is started to plate 28. Thus the current flow through cathode resistor 33, during the sync pulse period, includes reduced screen grid current flow and an increased plate current flow, the plate current flow actually increasing from zero. Again, due to the fact that inductor 24 along with grid resistor 18 and the capacitance to ground of grid 31 acting together, attenuate high frequency components before they are able to reach grid 31, a generally rounded version of the sync pulse is actually present on grid 31. This rounded version of the sync pulse along with plate screened-grid switching action of amplifier 6 and the averaging action of the time constant circuit of AGC network 8, which is connected in series with the plate cathode path of amplifier 6, causes only a slight increase in the potential on cathode 41, said slight increase in potential, when added to the abovementioned fixed bias potential, having the general shape shown at (*c*) on the input curve of video amplifier 9. Therefore, any high frequency noise pulse, impressed across the output of detector 4, which attempts to go higher than this threshold bias (*c*) causes conduction in diode 5, thereby supplying a noise limiting action as previously explained. The effect of the noise limiting action of diode 5 on the AGC amplifier will now be discussed.

As has been previously stated diode 5 conducts to limit high frequency noise peak voltages impressed across the output of detector 4. Each time diode 5 conducts an additional current flows through cathode resistor 33 thereby acting to raise the potential of cathode 32 relative to the potential on grid 31. This effect is especially noticeable when the potentiometer arm in the cathode circuit of the AGC amplifier is set so as to place the major portion of resistor 33 in the cathode circuit. As a result the amplitude of the AGC bias, which is contributed by noise peaks superimposed upon the sync pulse is effectively reduced.

While I do not desire to be limited to any specific circuit parameters such parameters varying in accordance with individual designs, the following circuit values have been found entirely satisfactory in the illustrated embodiment of the invention:

| | | |
|---|---|---|
| Pentode 6 | | 6AU6 |
| Diode 5 | | ½ 6AL5 |
| Diode 20 | | ½ 6AL5 |
| Resistors: | | |
| 18 | ohms | 100,000 |
| 25 | do | 4,700 |
| 33 | do | 1,000 |

While there has been shown and described what at present is considered the preferred embodiment of the present invention, it will become obvious to those skilled in the art that various changes and modifications may be made therein without departing from the invention as defined by the appended claims.

Having thus described my invention, I claim:

1. In a television receiver, the combination which features a keyed automatic gain controller and a diode noise clipper in which the noise clipping level is automatically governed by the action of the gain controller, comprising: a pair of input terminals having a load therebetween, means for applying to said load negative picture phase signals inclusive of positive going sync pulses and also inclusive of video components, such signals being susceptible to accompaniment by undesired noise voltages of positive polarity, a diode rectifier having its anode connected to the high potential input terminal and its cathode in circuit with the low potential terminal, said rectifier becoming conductive to clip positive-polarity noise of a voltage in excess of the conduction-opposing bias on said diode, an AGC amplifier tube having a cathode-anode output circuit and a cathode-control electrode input circuit coupled to said load, means for automatically applying to the cathode of said diode rectifier a variable bias of such a nature as to oppose conductivity in proportion to the strength of such signals, such means comprising a resistor connected in series with the cathode of said AGC amplifier and said load and a connection from said resistor to the cathode of said rectifier, said bias always being sufficient to prevent the sync pulse peaks from rendering such diode conductive, synchronous keying means coupled to said AGC amplifier to render it conductive to develop such variable bias only during application of the sync pulses to its control electrode, whereby said variable bias is a function of sync pulse amplitude so that the clipping level established by said diode rectifier is also a function of such amplitude, and integrating means in circuit with said amplifier for developing an amplified AGC potential.

2. In a television receiver, the combination which features a keyed automatic gain controller and a diode noise clipper in which the noise clipping level is automatically governed by the action of the gain controller, comprising: a pair of input terminals having a load therebetween, said load comprising a high-frequency choke connected to the high potential terminal in series with a resistor connected to the low potential terminal; means for applying to said load negative picture phase signals inclusive of positive going sync pulses and also inclusive of video components, such signals being suceptible to accompaniment by undesired noise voltages of positive polarity, a diode rectifier having its anode connected to the high potential input terminal and its cathode in circuit with the low potential terminal, said rectifier becoming conductive to clip positive-polarity noise of a voltage in excess of the conduction-opposing bias on said diode, an AGC amplifier tube having a cathode-anode output circuit and a cathode-control electrode input circuit coupled to the resistor portion of said load, means for automatically applying to the cathode of said diode rectifier a variable bias of such a nature as to oppose conductivity in proportion to the strength of such signals, such means comprising a resistor connected in series with the cathode of said AGC amplifier and said load and a connection from said resistor to the cathode of said rectifier, said bias always being sufficient to prevent the sync pulse peaks from rendering such diode conductive, synchronous keying means coupled to the anode of said AGC amplifier to render it conductive to develop such variable bias only during application of the sync pulses to its control electrode, whereby said variable bias is a function of sync pulses amplitude so that the clipping level established by said diode rectifier is also a function of such amplitude, and integrating means in circuit with such keying means for developing an amplified AGC potential.

3. In a television receiver, the combination which features a keyed automatic gain controller and a diode noise clipper in which the noise clipping level is automatically governed by the action of the gain controller, comprising: a pair of input terminals having a load therebetween, means for applying to said load negative picture phase signals inclusive of positive going sync pulses and also inclusive of video components, such signals being susceptible to accompaniment by undesired noise voltages of positive polarity, a diode rectifier having its anode connected to the high potential input terminal and its cathode in circuit with the low potential terminal, said rectifier becoming conductive to clip positive-polarity noise of a voltage in excess of the conduction-opposing bias on said diode, an AGC amplifier tube having a cathode-anode output circuit and a cathode-control electrode input circuit coupled to said load, a fixed source of bias potential connected between said load and the low potential input terminal to provide negative bias for the anode of said diode rectifier and the control electrode of said AGC amplifier, means for automatically applying to the cathode of said diode rectifier a variable positive bias of such a nature as to oppose conductivity in proportion to the strength of such signals, such means comprising a resistor connected in series with the cathode of said AGC amplifier and said load and a connection from said resistor to the cathode of said rectifier, said positive bias and the aforementioned negative bias together always being sufficient to prevent the sync pulse peaks from rendering such diode conductive, synchronous keying means coupled to the anode of said AGC amplifier to render it conductive to develop such variable bias only during application of the sync pulses to its control electrode, whereby said variable bias is a function of syn pulse amplitude so that the clipping level established by said diode rectifier is also a function of such amplitude, and integrating means in circuit with said amplifier for developing an amplified AGC potential.

4. In a television receiver, the combination which features a keyed automatic gain controller and a diode noise clipper in which the noise clipping level is automatically governed by the action of the gain controller, comprising: a pair of input terminals having a load therebetween, means for applying to said load negative picture phase signals inclusive of positive going sync pulses and also inclusive of video components, such signals being susceptible to accompaniment by undesired noise voltages of positive polarity, a diode rectifier having its anode connected to the high potential input terminal and its cathode in circuit with the low potential terminal, said rectifier becoming conductive to clip positive-polarity noise of a voltage in excess of the conduction-opposing bias on said diode, an AGC amplifier tube having a screen grid and a cathode-anode output circuit and a cathode-control electrode input circuit coupled to said load, means for automatically applying to the cathode of said diode rectifier a variable bias of such a nature as to oppose conductivity in proportion to the strength of such signals, such means comprising a resistor connected in series with the cathode of said AGC amplifier and said load and a connection from said resistor to the cathode of said rectifier, said bias always being sufficient to prevent the sync pulse peaks from rendering such diode conductive, synchronous keying means coupled to the anode of said AGC amplifier to render it conductive to develop such variable bias only during application of the sync pulses to its control electrode, whereby said variable bias is a function of sync pulse amplitude so that the clipping level established by said diode rectifier is also a function of such amplitude, and integrating means in circuit with such keying means for developing an amplified AGC potential.

5. In a television receiver having a signal channel, the combination which includes a keyed amplifier and a diode noise clipper in which the noise clipping level is automatically governed by the action of the amplifier, comprising: a pair of input terminals having a load therebetween, means for applying to said load negative picture phase signals inclusive of positive going sync pulses and also inclusive of video components, such signals being susceptible to accompaniment by undesired noise voltages of positive polarity, a diode rectifier having its anode connected to the high potential input terminal and its cathode in circuit with the low potential terminal, said rectifier becoming conductive to clip positive-polarity noise of a voltage in said signal channel in excess of the conduction-opposing bias on said diode, a keyed amplifier tube having a cathode-anode output circuit and a cathode-control electrode input circuit coupled in shunt to said video channel, means for automatically applying to the cathode of said diode rectifier a variable bias of such a nature as to oppose conductivity in proportion to the strength of such signals, such means comprising a resistor connected in series with the cathode of said amplifier tube and a connection from said resistor to the cathode of said rectifier, said bias always being sufficient to prevent the sync peaks from rendering such diode conductive, and synchronous keying means coupled to said amplifier to render it conductive to develop such variable bias only during application of the sync pulses to its control electrode, whereby said variable bias is a function of sync pulse amplitude so that the clipping level established in said channel by said diode rectifier is also a function of such amplitude.

6. In a television receiver having a signal channel, the combination which includes a keyed amplifier and a diode noise clipper in which the noise clipping level is automatically governed by the action of the amplifier, comprising: a pair of input terminals, means for applying to said terminals negative picture phase signals inclusive of positive going sync pulses and also inclusive of video components, such signals being susceptible to accompaniment by undesired noise voltages of positive polarity, a diode rectifier having its anode connected to the high potential input terminal and its cathode in circuit with the low potential terminal, said rectifier becoming conductive to clip positive-polarity noise of a voltage in said signal channel in excess of the conduction-opposing bias on said diode, a keyed amplifier tube having a cathode-anode output circuit and a cathode-control electrode input circuit coupled in shunt to said video channel, means for automatically applying to the cathode of said diode rectifier a variable bias of such a nature as to oppose conductivity in proportion to the strength of such signals, such means comprising a resistor connected in series with the cathode of said amplifier tube and a connection from said resistor to the cathode of said rectifier, said bias always being sufficient to prevent the sync peaks from rendering such diode conductive, and keying means coupled to said amplifier to render it conductive to develop such variable bias.

References Cited in the file of this patent

UNITED STATES PATENTS

| | | |
|---|---|---|
| 2,144,995 | Pulvari-Pulvermacher | Jan. 24, 1939 |
| 2,192,189 | Haffcke | Mar. 5, 1940 |
| 2,221,700 | Clapp | Nov. 12, 1940 |
| 2,247,324 | Travis | June 24, 1941 |
| 2,284,085 | Collard | May 26, 1942 |
| 2,296,393 | Martinelli | Sept. 22, 1942 |
| 2,302,520 | Bingley | Nov. 17, 1942 |
| 2,305,931 | Martinelli | Dec. 22, 1942 |
| 2,339,857 | Holmes | Jan. 25, 1944 |
| 2,559,038 | Bass | July 3, 1951 |
| 2,569,289 | Clark | Sept. 25, 1951 |
| 2,585,883 | Wendt et al. | Feb. 12, 1952 |
| 2,593,011 | Cotsworth | Apr. 15, 1952 |
| 2,615,089 | Rogers | Oct. 21, 1952 |
| 2,637,773 | Bedford | May 5, 1953 |
| 2,637,774 | Avins | May 5, 1953 |
| 2,668,234 | Druz | Feb. 2, 1954 |
| 2,776,338 | Avins | Jan. 1, 1957 |

U. S. DEPARTMENT OF COMMERCE

PATENT OFFICE

CERTIFICATE OF CORRECTION

Patent No. 2,829,197 Victor J. Scott April 1, 1958

It is hereby certified that error appears in the printed specification of the above numbered patent requiring correction and that the said Letters Patent should read as corrected below.

Column 4, line 62, for "exclusively" read -- exhaustively --; column 7, line 63, for "pulses" read -- pulse --; column 8, line 27, for "syn" read -- sync --.

Signed and sealed this 24th day of June 1958.

(SEAL)

Attest:

KARL H. AXLINE

Attesting Officer

ROBERT C. WATSON

Commissioner of Patents